(12) United States Patent
Sales (10) Patent No.: US 7,113,335 B2
(45) Date of Patent: Sep. 26, 2006

(54) GRID POLARIZER WITH SUPPRESSED REFLECTIVITY

(76) Inventor: Tasso R. Sales, 153 W. Squire Dr. #8, Rochester, NY (US) 14623

( * ) Notice: Subject to any disclaimer, the term of this patent is extended or adjusted under 35 U.S.C. 154(b) by 125 days.

(21) Appl. No.: 10/733,955

(22) Filed: Dec. 11, 2003

(65) Prior Publication Data

US 2004/0125449 A1    Jul. 1, 2004

Related U.S. Application Data

(60) Provisional application No. 60/437,226, filed on Dec. 30, 2002.

(51) Int. Cl.
*G02B 5/30* (2006.01)
*G02B 27/28* (2006.01)

(52) U.S. Cl. ........................ 359/486; 359/576

(58) Field of Classification Search ............... 359/486, 359/576, 569
See application file for complete search history.

(56) References Cited

U.S. PATENT DOCUMENTS

| | | |
|---|---|---|
| 2,224,214 A | 12/1940 | Brown |
| 2,287,598 A | 6/1942 | Brown |
| 2,748,659 A | 6/1956 | Geffcken et al. |
| 2,887,566 A | 5/1959 | Marks |
| 3,046,839 A | 7/1962 | Bird et al. |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,631,288 A | 12/1971 | Rogers |
| 3,857,627 A | 12/1974 | Harsch |
| 3,876,285 A | 4/1975 | Schwarzmuller |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,073,571 A | 2/1978 | Grinberg et al. |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,456,515 A | 6/1984 | Krueger et al. |
| 4,466,704 A | 8/1984 | Schuler et al. |
| 4,512,638 A | 4/1985 | Sriram et al. |
| 4,514,479 A | 4/1985 | Ferrante |
| 4,515,441 A | 5/1985 | Wentz |

(Continued)

FOREIGN PATENT DOCUMENTS

EP    0317910    11/1987

(Continued)

*Primary Examiner*—Mark A. Robinson
*Assistant Examiner*—Mark Consilvio
(74) *Attorney, Agent, or Firm*—Timothy M. Schaeberle (57) ABSTRACT

Disclosed is a grid polarizer comprising a substrate; and a plurality of stacked metal and dielectric layers, having a width w, disposed on the substrate and forming a parallel grid of stacked layers. The stacked layers are spaced apart to form a repetition space between the stacked layers, such that no diffraction orders are allowed to propagate except the zero order. The grid polarizer that is capable of transmitting substantially all illumination of a given polarization while suppressing at least of portion of the illumination reflected due to an orthogonal polarization component.

20 Claims, 12 Drawing Sheets

U.S. PATENT DOCUMENTS

| | | |
|---|---|---|
| 4,688,897 A | 8/1987 | Grinberg et al. |
| 4,711,530 A | 12/1987 | Nakanowatari et al. |
| 4,743,092 A | 5/1988 | Pistor |
| 4,759,611 A | 7/1988 | Downey, Jr. |
| 4,759,612 A | 7/1988 | Nakatsuka et al. |
| 4,799,776 A | 1/1989 | Yamazaki et al. |
| 4,818,076 A | 4/1989 | Heppke et al. |
| 4,865,670 A | 9/1989 | Marks |
| 4,895,769 A | 1/1990 | Land et al. |
| 4,913,529 A | 4/1990 | Goldenberg et al. |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,061,050 A | 10/1991 | Ogura |
| 5,087,985 A | 2/1992 | Kitaura et al. |
| 5,113,285 A | 5/1992 | Franklin et al. |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,295,009 A | 3/1994 | Barnik et al. |
| 5,305,143 A | 4/1994 | Taga et al. |
| 5,325,218 A | 6/1994 | Willett et al. |
| 5,333,072 A | 7/1994 | Willett |
| 5,357,370 A | 10/1994 | Miyatake et al. |
| 5,383,053 A | 1/1995 | Hegg et al. |
| 5,422,756 A | 6/1995 | Weber |
| 5,436,761 A | 7/1995 | Kamon |
| 5,486,935 A | 1/1996 | Kalmanash |
| 5,486,949 A | 1/1996 | Schrenk et al.. |
| 5,490,003 A | 2/1996 | Van Sprang |
| 5,506,704 A | 4/1996 | Broer et al. |
| 5,508,830 A | 4/1996 | Imoto et al. |
| 5,513,023 A | 4/1996 | Fritz et al. |
| 5,513,035 A | 4/1996 | Miyatake et al. |
| 5,517,356 A | 5/1996 | Araujo et al. |
| 5,557,343 A | 9/1996 | Yamagishi |
| 5,559,634 A | 9/1996 | Weber |
| 5,570,215 A | 10/1996 | Omae et al. |
| 5,574,580 A | 11/1996 | Ansley |
| 5,579,138 A | 11/1996 | Sannohe et al. |
| 5,594,561 A | 1/1997 | Blanchard |
| 5,612,820 A | 3/1997 | Schrenk et al. |
| 5,619,356 A | 4/1997 | Kozo et al. |
| 5,626,408 A | 5/1997 | Heynderickz et al. |
| 5,748,368 A | 5/1998 | Tamada et al. |
| 5,748,369 A | 5/1998 | Yokota |
| 5,833,360 A | 11/1998 | Knox et al. |
| 6,122,103 A | 9/2000 | Perkins et al. |
| 6,447,120 B1 | 9/2002 | Hansen et al. |
| 6,532,111 B1 | 3/2003 | Kurtz et al. ............... 359/486 |
| 6,542,307 B1 | 4/2003 | Gleckman et al. |
| 6,563,582 B1 | 5/2003 | Chun |
| 6,563,648 B1 | 5/2003 | Gleckman et al. |
| 6,585,378 B1 | 7/2003 | Kurtz et al. |
| 6,590,695 B1 | 7/2003 | Kurtz et al. |
| 6,643,077 B1 | 11/2003 | Le |
| 6,648,475 B1 | 11/2003 | Roddy et al. |
| 6,813,077 B1 * | 11/2004 | Borrelli et al. ............. 359/486 |

FOREIGN PATENT DOCUMENTS

| | | |
|---|---|---|
| EP | 0336334 | 4/1988 |
| EP | 0349309 | 6/1988 |
| EP | 0357946 | 8/1988 |
| EP | 0407830 | 7/1989 |
| EP | 416157 | 9/1989 |
| EP | 0488544 | 11/1990 |
| EP | 0507445 | 3/1991 |
| EP | 0518111 | 5/1991 |
| EP | 0588937 | 6/1991 |
| EP | 0521591 | 7/1991 |
| EP | 0543061 | 11/1991 |
| EP | 0606940 | 1/1993 |
| EP | 0634674 | 6/1993 |
| EP | 0670506 | 9/1993 |
| EP | 0744634 | 5/1995 |
| WO | WO2002052305 | 7/2002 |
| WO | WO2003032029 | 4/2003 |

* cited by examiner

GRID POLARIZER WITH SUPPRESSED REFLECTIVITY

CROSS-REFERENCE TO RELATED APPLICATIONS

This application claims the benefit of priority of U.S. Provisional Application Ser. No. 60/437,226 filed on Dec. 30, 2002, which is incorporated by reference herein in its entirety.

FIELD OF THE INVENTION

The present invention relates to polarizing optical elements for use in the visible portion of the electromagnetic spectrum. More particularly, the present invention relates to a highly efficient grid polarizing apparatus exhibiting improved transmitted illumination polarization contrast which is the result of the grid polarizing apparatus' ability to substantially suppress the reflection due to the orthogonal polarization component and thus the prevention of unwanted reflections back towards the illumination beam.

BACKGROUND OF THE INVENTION

Figure 1:
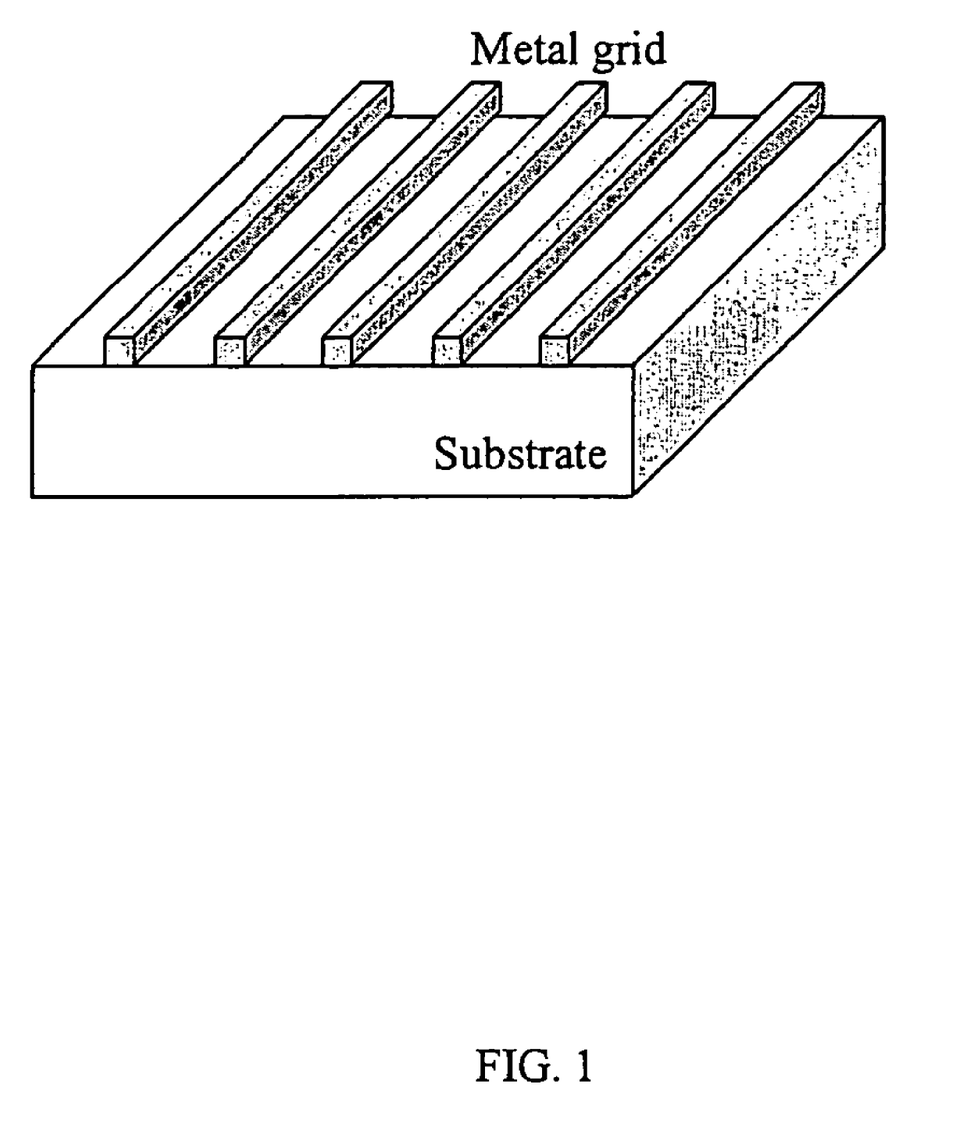
FIG. 1 is a perspective view of a prior art conventional grid polarizer.

Polarizing devices are of utilized in numerous optical systems and are commonly used in various applications such as liquid-crystal displays and optical isolators. The present invention relates to grid polarizers also referred to as wire-grid polarizers. Grid polarizers are well known in the art and in their simplest form, generally include a glass substrate on top of which metallic stripes (or wires) are deposited. As illustrated in FIG. 1, the separation between grid lines is such that only the zero order propagates for the wavelength range of interest. Typical metals utilized include Aluminum (Al), Silver (Ag), Gold (Au), Copper (Cu), and Chrome (Cr). In general, grid polarizers operate as follows. Contrary to the substrate where most electrons are bound to atoms or molecules, in the metal there is a high density of free electrons that oscillate in response to an external electromagnetic field. If the external field is polarized along the orientation of the grid (TE polarization), it excites the electrons causing re-emission of the incident radiation. If the external electromagnetic field is oriented perpendicular to the grid (TM polarization) a reduced number of electrons oscillate resulting in most of the incident illumination being transmitted. The result is that the basic properties of a grid polarizer include the following: (1) high transmission of TM polarization ($T_{TM}$); (2) low reflection of TM polarization ($R_{TM}$); (3) high reflection of TE polarization ($R_{TE}$); and, (4) low transmission of TE polarization ($T_{TE}$).

In order to characterize the performance of grid polarizers it is common to use two parameters: insertion loss and contrast ratio. The insertion loss, directly related to the total transmission of the polarizer, is defined as $$IL = -10 \log_{10} T_{TM}, \quad (1)$$

while the contrast ratio is defined as $$CR = 10 \log_{10} \frac{T_{TM}}{T_{TE}}, \quad (2)$$

with both quantities being measured in dB. It is generally desired to minimize the insertion loss and maximize contrast ratio. As can be seen from definition (1), if all TM polarization is transmitted $T_{TM}=1$ then the resultant IL=0 dB. For high contrast ratio the transmitted illumination must be essentially of a single polarization (TM), implying that $T_{TE}$ should tend to zero. In this case the contrast ratio tends to infinity. In practice, however, typical grid polarizers exhibit values of contrast ratio which are in the range 20–60 dB and insertion losses typically below 0.5 dB.

One variation to the basic grid polarizer geometry illustrated in FIG. 1 is found described in U.S. Pat. No. 5,748,368, wherein it discloses a structure comprising of a lamination of the grid between two substrates so that the metal grid is embedded in a medium exhibiting a higher index than air. As a result of this approach the insertion loss can be considerably reduced over a limited spectral region.

Another variation is disclosed in U.S. Pat. No. 6,122,103, wherein it discloses a grid polarizer that incorporates homogeneous thin-film layers between the substrate and the metal grid or further includes etches incorporated into the substrate. The goal of this modified polarizer is to extend the wavelength range of operation, particularly in the visible between 400 nm and 700 nm. Both of these aforementioned approaches to grid polarizers focus on improving performance as measured by insertion loss and contrast ratio but without significantly affecting the reflective properties of the polarizer.

There are, however, applications where it is desired that the polarizer exhibit low insertion loss, high contrast ratio, and in addition a substantial suppression of the reflected TE polarization component. An example of such a device is the optical isolator, which allows essentially one-way propagation of radiation. The typical optical isolator includes two polarizers and a Faraday rotator. The polarizers have their axis of polarization rotated by 45°. To meet increasing requirements in component stability and compactness it is desirable to integrate the various components of the isolator by having grid polarizers patterned directly into the Faraday rotator material. The integrated optical isolator incorporates the polarizing and polarization-rotation function within a single device. One difficulty with this apparatus is that back-reflected light coming towards the laser suffers internal reflections in the grid polarizers that leads to undesirable illumination returning towards the source.

As such there remains the need for a polarizer exhibiting improved transmitted illumination in combination with a substantially suppressed orthogonal-polarization reflection illumination.

SUMMARY OF THE INVENTION

In accordance with aspect of the invention, provided is a grid polarizer which transmits substantially all illumination of a given polarization and suppresses substantially all illumination reflected by an orthogonal polarization.

In accordance with another aspect, the invention provides a grid polarizer which transmits substantially all illumination of a given polarization and suppresses a specific fraction of the reflected illumination due to an orthogonal polarization.

According to another embodiment of the invention, the polarizer is comprised of a regular grid composed by three distinct materials stacked over a dielectric substrate and on top of each other and with uniform lateral extension (width). The first material, closest to the substrate is comprised of metal, the second material is comprised of a dielectric material, and the third material comprised of another metal.

According to another embodiment of the invention, the polarizer is comprised of a regular grid composed by three distinct materials stacked over a dielectric substrate and on top of each other and with variable extension (width). The first material, closest to the substrate is comprised of metal, the second material is comprised of a dielectric material, and the third material is comprised of metal.

According to another embodiment of the invention, the polarizer is comprised of a regular grid composed by three distinct materials stacked over a dielectric substrate and on top of homogeneous dielectric film layers and on top of each other and with uniform lateral extension (width). The first material, closest to the substrate is comprised of metal, the second material is comprised of a dielectric material, and the third material is comprised of another metal.

According to a further embodiment of the invention, the polarizer is comprised of a regular grid composed by three distinct materials stacked over a dielectric substrate and on top of homogeneous dielectric film layers and on top of each other and with variable extension (width). The first material, closest to the substrate is comprised of metal, the second material is comprised of a dielectric material, and the third material is comprised of another metal.

DETAILED DESCRIPTION OF THE PREFERRED EMBODIMENTS

Figure 2A:
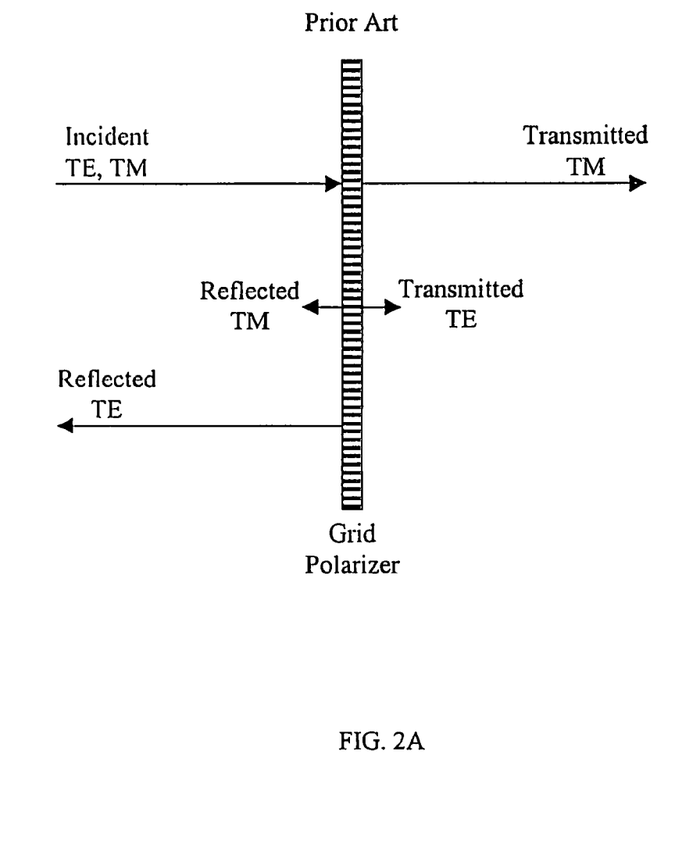
FIG. 2A is a schematic representation of the flow of electromagnetic energy for prior art grid polarizers.
Figure 2B:
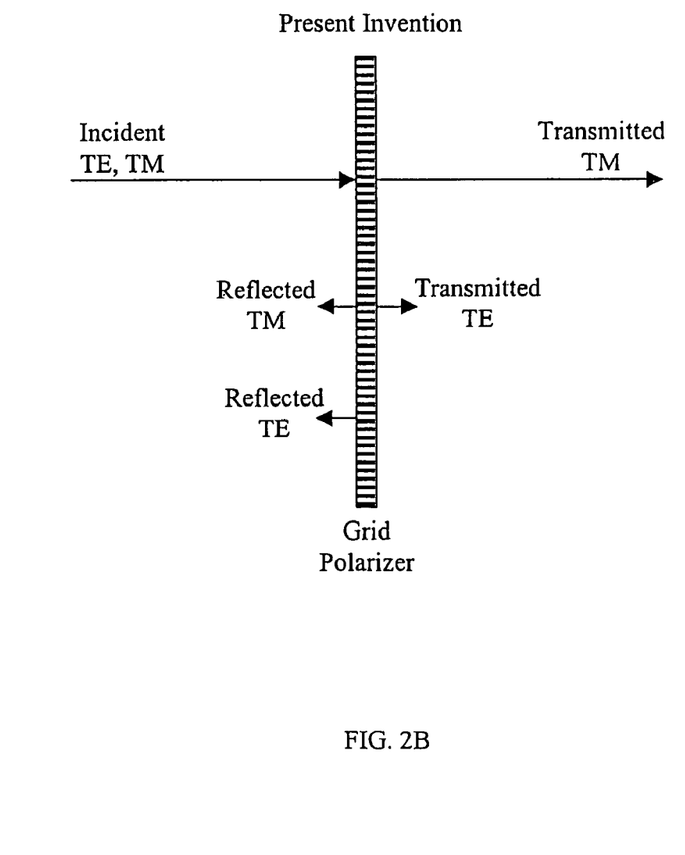
FIG. 2B is a schematic representation of the flow of electromagnetic energy for the grid polarizer disclosed in the present invention.

Prior art polarizers exhibit polarizing ability with high transmission a polarization component together coupled with high reflectivity of the orthogonal polarization component. The flow of electromagnetic energy is schematically illustrated on FIG. 2A for the current prior art and FIG. 2B for the present invention.

Figure 3:
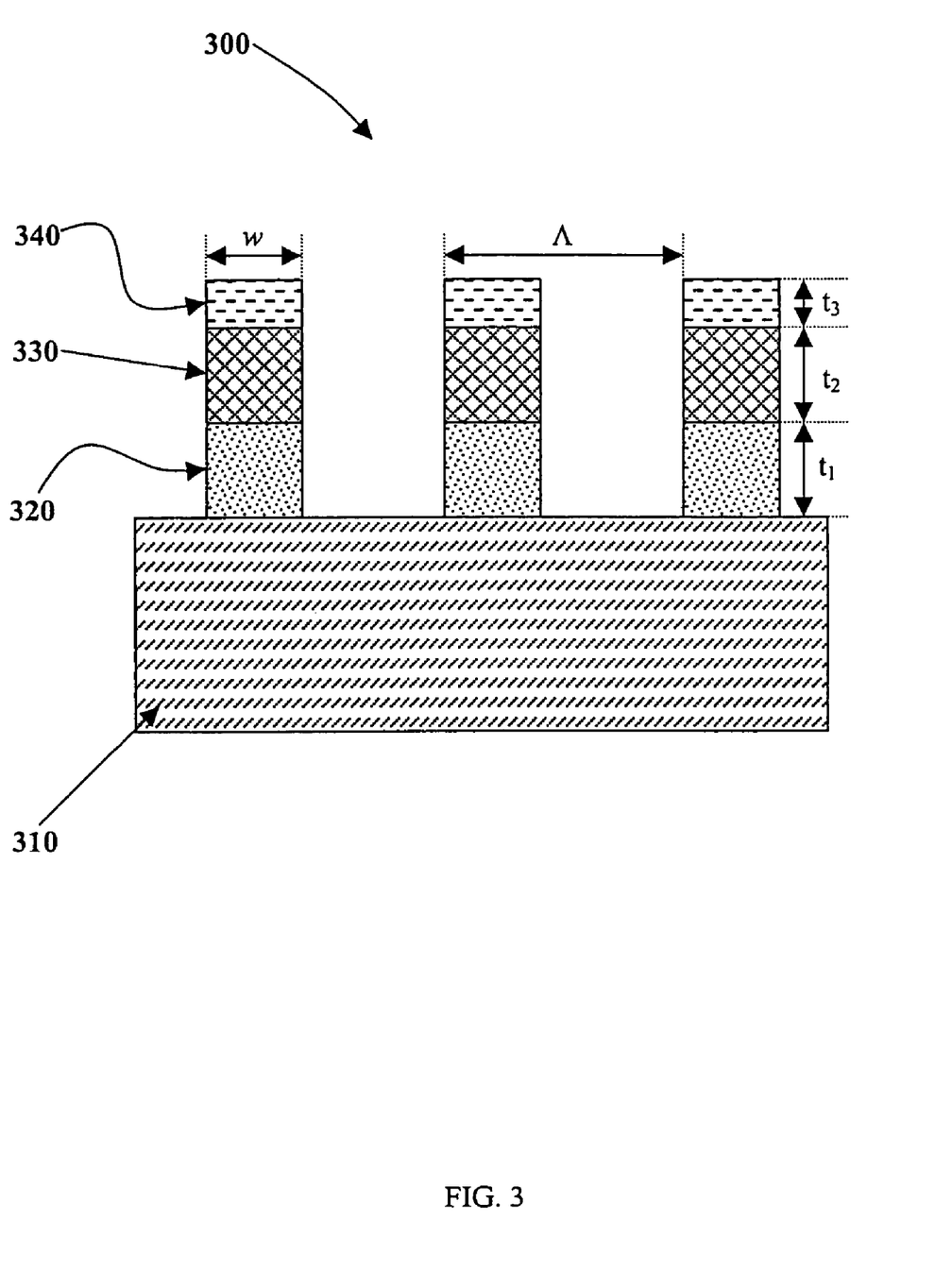
FIG. 3 is a cross-sectional view of a grid polarizer according to a first embodiment of the invention.

In general, the grid polarizer of the instant invention is comprised of a plurality of stacked materials (metal and dielectric) arranged as part of the repetition grid or as homogenous layers. Referring specifically now to FIG. 3, the grid polarizer 300 comprises a dielectric (generally glass) substrate 310 supporting a stack of metal and dielectric layers arranged as a parallel grid. Layer 320 is preferably made of a metallic material. Layer 330 is preferably made of a dielectric material. Layer 340 is preferably made of a metallic material. The medium of incidence that surrounds the grid is generally air (index of refraction equal to 1), although it can comprised of a general dielectric, if the grid is embedded or encapsulated in a material exhibiting an index of refraction different from 1 (not shown); e.g., Polycarbonate, $SiO_2$ or Silicon. The repetition space of the grid, or the space between the respective right edges of the top metal layer of each of the stacked metal-dielectric layers, is given the designation $\Lambda$. The repetition space between one metal-dielectric layer and the adjacent metal-dielectric layer should be constant, however the constant value of the repetition space between one pair of adjacent metal-dielectric layers can either be constant or varied when compared to another pair of adjacent metal-dielectric layers; in other words $\Lambda 1$ may be equal to, or different than $\Lambda 2$. The width of each grid line, respective metal-dielectric layers is designated as w. The thickness of layers 320, 330, and 340 are designated $t_1$, $t_2$, and $t_3$, respectively. To operate efficiently as a polarizer the repetition space $\Lambda$ must be such that no diffraction orders are allowed to propagate except the zero order. If $\theta$ is the angle of incidence of the impinging illumination and $\lambda$ is the wavelength, then a diffracted beam of order m is deflected at an angle $\theta_m$ where $$n_t \sin\theta_m = n_i \sin\theta + m\frac{\lambda}{\Lambda}, \tag{3}$$

assuming the incident and transmitted media have indices of refraction $n_i$ and $n_t$, respectively. To ensure that only the zero order propagates the repetition space between the adjacent metal-dielectric layers must satisfy the following relation $$\Lambda < \frac{\lambda}{n_t - n_i \sin\theta}. \tag{4}$$

The value for the repetition space $\Lambda$ is generally limited by fabrication capabilities but, at the very least, relation (4) should be satisfied for an efficient polarizing capability. The value of $\Lambda$ depends on the wavelength of the incident illumination but is typically between 100 nm and 1000 nm. The remaining quantities to be determined are the grating line or width w and the layer thickness $t_k$, k=1, 2, 3. Although there are no closed form mathematical relations that determine line width and thickness, given the other grid parameters, the values are able to be empirically determined based on the later described multiple beam interference model that allows some estimates and proposed grid polarizers to be proposed. It should be noted that it is necessary to rigorously solve the electromagnetic scattering by the grid in order to calculate the exact parameters that lead to absorption of the reflected field component.

While not intending to limited by theory, the following is an explanation of rationale regarding the shortcomings of conventional grid polarizers, that is the fact that they strongly reflect the TE polarization component while transmitting the TM component. For this explanation we employ the so-called effective medium theory. The concept of effective medium theory is that, in the limit when the wavelength of light incident on the grid is much larger than the grid spacing, the actual structure of ridges and grooves cannot be resolved by the impinging electromagnetic wave. As a result, no diffraction orders are generated and the grid behaves as a homogeneous effective medium with indices of refraction that depend on the grid structure and the polarization of the incident illumination. The advantage of the effective medium approach is that it greatly simplifies the analysis of the problem since one is left with thin film layers to model instead of the more complicated grating structure. Although it is possible to formulate effective medium theories with varying degrees of sophistication, the simplest version, known as zero-order effective medium theory, is adopted. In this limit the grid period is not taken into account, which is assumed to be much less than the wavelength. Even if this is not the actual case, strictly speaking, zero-order effective medium theory is useful in understanding the underlying physics of the problem.

Accordingly, within a zero-order effective medium theory, the effective index of refraction $n_{eff}$ for a grid with fill factor f (ratio of line width w to grid period $\Lambda$) and indices $n_1$ and $n_2$ is given by $$n_{eff} = \sqrt{fn_1^2 + (1-f)n_2^2}, \quad (3)$$

for TE polarization and $$n_{eff} = \sqrt{\frac{f}{n_1^2} + \frac{(1-f)}{n_2^2}}, \quad (4)$$

in the case of TM polarization.

As an example of a conventional grid polarizer, consider a grid consisting of aluminum wires with f=0.5 operating at wavelength $\lambda$=1550 nm. The index of aluminum at this wavelength equals n=1.5147+i5.9440. Calculating the effective indices we obtain $n_{eff}$=1.0732+i11.2521 (TE) and $n_{eff}$=1.4169+i0.0005 (TM). Note that the refractive index for TE polarization resembles that of a metal implying that most of the incident light is reflected. On the other hand, the refractive index for TM polarization is basically real (dielectric) implying high transmission. If a fused silica substrate operating at $\lambda$=1550 nm (index 1.444), is considered, the fraction of reflected TE polarization is 95.34% while the fraction of transmitted TM is 99.99%, at normal incidence. This comparative example device therefore clearly acts as a polarizer in spite of the high TE reflection, however given this undesirable high TE reflection value, the device is unsuitable for applications where the high reflectivity may degrade the performance of the system by back-reflecting towards the source. The present invention thus provides a grid polarizer that suppresses the highly reflective component of the electromagnetic radiation while maintaining high transmission of the orthogonal polarization component.

Based on the fact that because metals naturally reflect a significant fraction of the incident illumination and grid polarizers require the use of metals for an efficient polarization effect, in order to overcome the shortcomings of the aforementioned prior art grid polarizer, a novel grid structure, such as described in the present invention, must be utilized to accomplish suppression of the reflected power.

The configuration of the inventive grid polarizer is based on the multiple-beam interference model and the aforementioned teachings related to the shortcomings of the comparative prior art grid polarizer. Instead of using a single metal layer deposited on a substrate as in the prior art of grid polarizers, two metal layers are utilized and separated by a dielectric material layer as indicated by the representation of the first embodiment illustrated on FIG. 3. Such configuration does not affect the TM performance significantly but, as seen from an effective medium formulation, creates a multilayer stack that when properly designed can provide destructive interference for the reflected TE polarization. The equivalence of the grid structure and the thin-film effective medium stack, according with the teachings of the invention, is illustrated on FIG. 4. In order to correctly implement of the invention the following conditions must be satisfied: (1) the thickness of the metallic layer closest to the substrate must be many times thicker than the penetration depth of the metal so that it reflects substantially all TE-polarized illumination; (2) the thickness of the metallic layer farthest away from the substrate must only be thick enough that it allows transmission into the middle dielectric layer while it is still understood that, due to the metallic nature of the layer, considerable portion of the illuminating beam is still reflected and may also suffer absorption losses. These two aspects of the invention will be clearly illustrated in the several examples proposed in the later described examples reported in Tables I and II.

Figure 4:
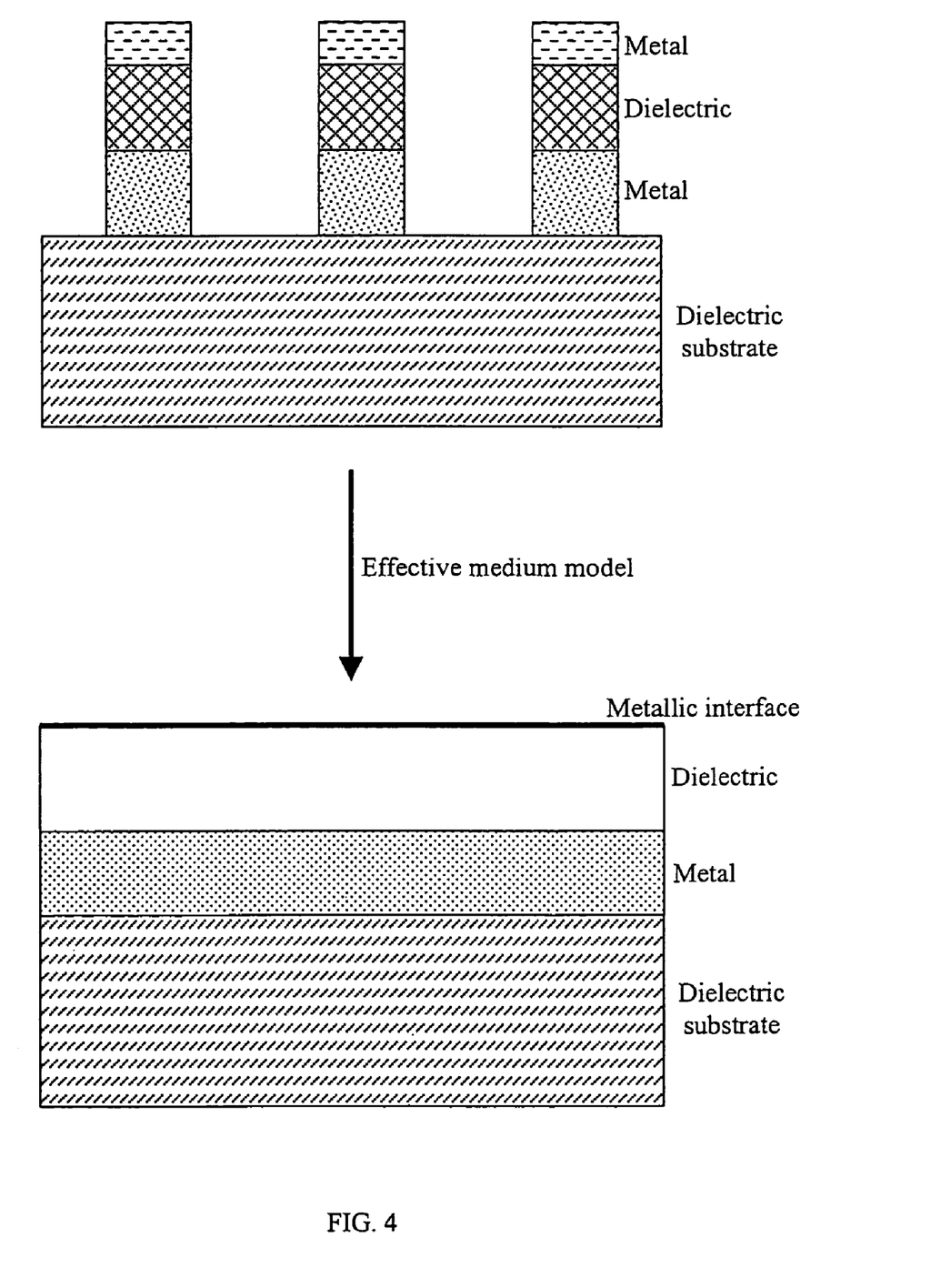
FIG. 4 is a schematic representation of the equivalence between the grid polarizer and the thin-film effective medium model.
Figure 5:
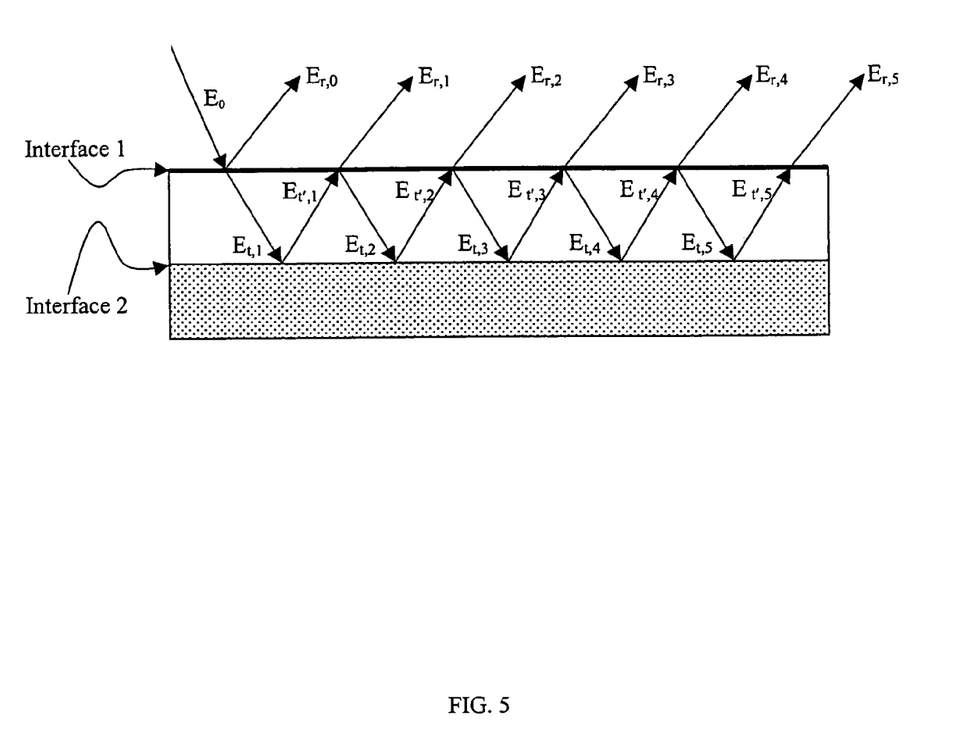
FIG. 5 is a schematic representation illustrating multiple reflections in the thin-film effective medium model of the grid polarizer.

To illustrate in more precise terms how suppression of the TE polarization component ensues the effective medium thin-film model shown in FIG. 4 is utilized to explicitly calculate the field resulting from the multiple beams reflected by the effective metallic film surfaces. For this purpose and, again with reference to FIG. 4, two simplifying assumptions are adopted in the following descriptions with the sole purpose of allowing the derivation of closed-form mathematical expressions for the field. The assumptions are: (1) the metallic film closest to the substrate is thick enough that no TE-polarized light is transmitted through it and (2) the metallic film farthest away from the substrate behaves as a metallic interface with transmission coefficient t (from the incident medium into the middle dielectric film), transmission coefficient t' (from the middle dielectric film into the incident medium), reflection coefficient r (when incident from the incident medium), and reflection coefficient r' (when originating from the middle dielectric film). The whole set of reflected and transmitted TE-field components are illustrated on FIG. 5 by means of the indicated rays. The incident electric field is denoted by $E_0$. The field components propagating towards the incident medium due to the first as well as multiple internal reflections are denoted by $E_{r,k}$ with k=0, 1, 2, 3, . . . The field components transmitted through interface 1, interface between top metal layer and middle dielectric layer, into the dielectric film layer are denoted by $E_{t',k}$ with k=1, 2, 3, . . . The field components reflected from interface 2, interface between bottom metal layer and middle dielectric layer, back into the dielectric film layer are denoted by $E_{t,k}$ with k=1, 2, 3, . . . Also, as a ray propagates from an entry point at interface 1 until it hits interface 2 it accumulates a phase shift $\phi$ which is given by $$\varphi = \frac{2\pi}{\lambda} 2n\tau \cos\theta, \tag{5}$$

where λ is the wavelength of the electromagnetic radiation, n is the effective index of the dielectric film, τ is the thickness of the dielectric film, and θ is the angle of incidence. Taking into account all reflected field components, the total reflected field is given by $$E_r = \sum_{k=0}^{\infty} E_{r,k}, \tag{6}$$

or, writing individual terms explicitly, $$E_r = r + t't \exp(i\varphi) + r't't \exp(i2\varphi) + r'^2 t't \exp(i3\varphi) + r'^3 t't \exp(i4\varphi) + \ldots \tag{7}$$

The above infinite sum can be solved in closed form as follows $$E_r = r + \frac{t't \exp(i\varphi)}{1 - r' \exp(i\varphi)}. \tag{8}$$

Because interface 1 is lossy, Stokes' relation is written as $$tt' + r^2 = 1 - a, \tag{9}$$

where a represents the absorption experienced by the incident illumination upon interaction with interface 1, the interface between top metal layer and middle dielectric layer. Substituting this equation into the expression for the reflected field, Eq. (8), and calculating the transmission intensity $I_r$, the following equation is obtained:

$$I_r = |E_r|^2 = \frac{(r + 1 - a)^2 - 4r(1-a)\sin^2\frac{1}{2}\varphi}{(r+1)^2 - 4r\sin^2\frac{1}{2}\varphi}. \tag{10}$$

Figure 6:
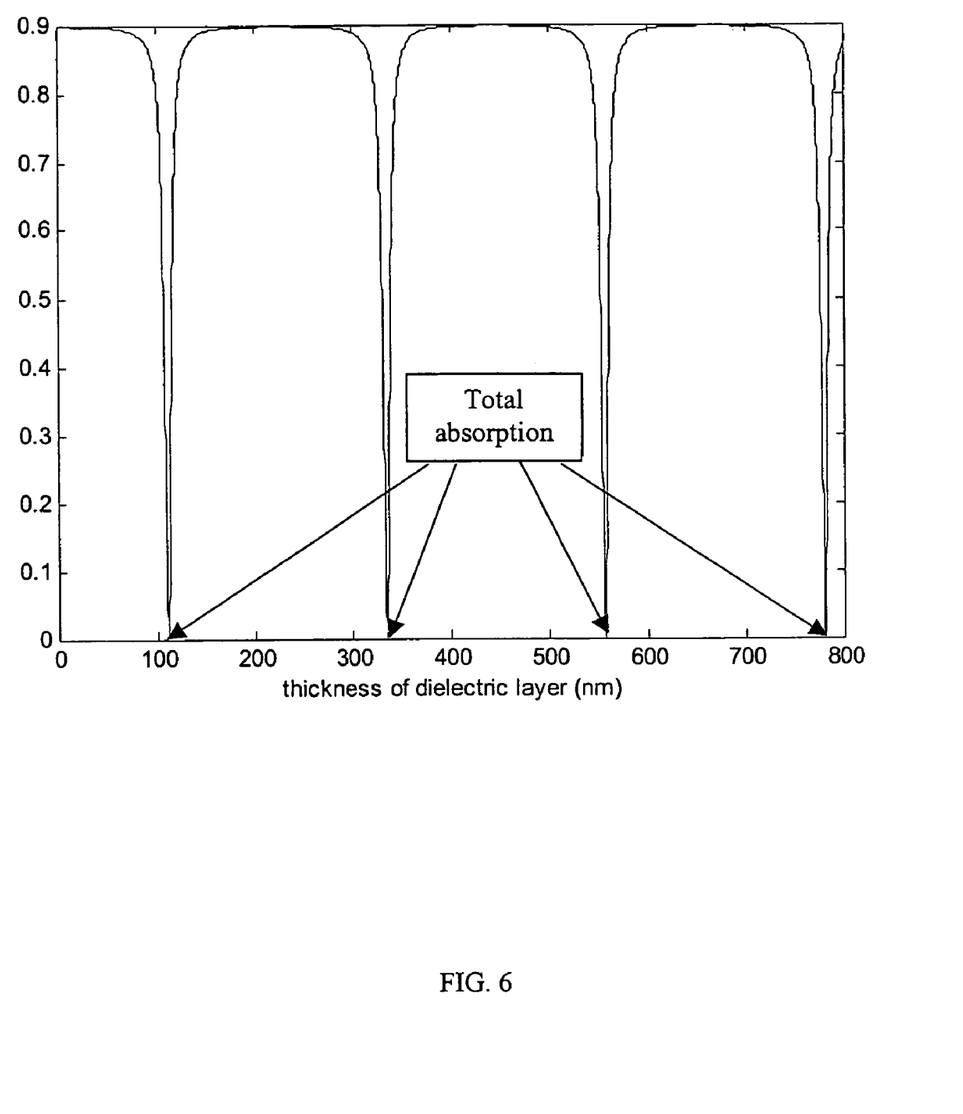
FIG. 6 is a graphical representation of the reflected field intensity due to a grid polarizer of the present invention modeled with the effective medium theory.
Figure 7:
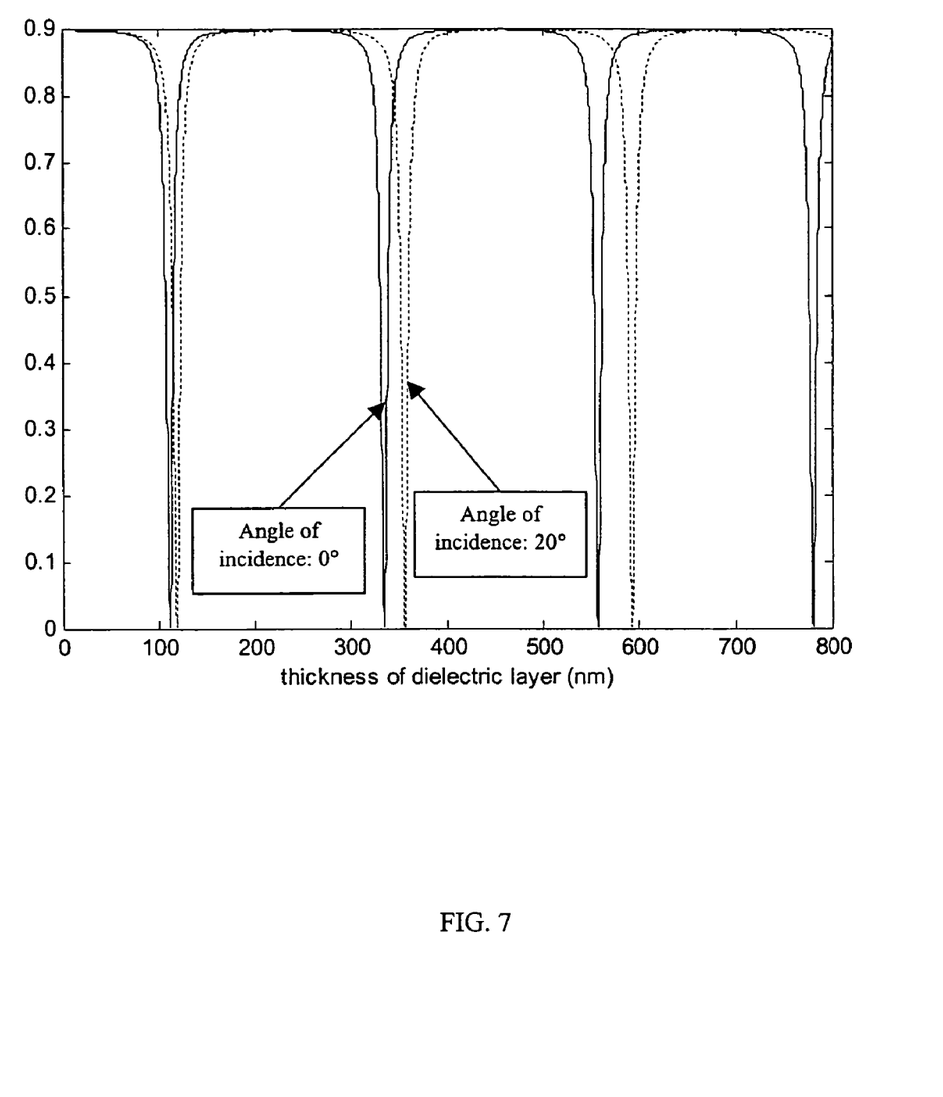
FIG. 7 is a graphical representation of the reflected field intensity due to a grid polarizer of the present invention modeled with the effective medium theory and the effecting of tilt angle.

Note that, in the above equation, the presence of absorption losses in the metallic interface 1 is fundamental otherwise, as would be expected, all light would be reflected, i.e. $I_r = 1$ for the prior art grid polarizers. The expression for $I_r$ demonstrates and confirms that the multilayer grid configuration of the present invention leads to total suppression of the incident TE polarization. In other words, $I_r$ for the grid polarizer of the invention is less than 1, and preferably 0. For this purpose, one needs to determine the appropriate thickness of the middle dielectric layer. As an illustration of this capability consider a dielectric layer made of silicon at wavelength λ=1550 nm (index n=3.4777), normal incidence. Interface 1 between top metal layer and middle dielectric layer is assumed to be such that r=0.8 and a=0.1. A plot of the reflected transmission is presented on FIG. 6. For specific values of the dielectric layer thickness, total suppression is observed, which is a fundamental characteristic of the inventive grid polarizer. The plot also allows a quick estimate of the allowed values for the dielectric layer thickness that can be later used for a more precise optimization step. Note also that the tolerance for variations of the dielectric layer thickness is tight as the reflectivity can quickly increase as the thickness is varied. This issue can be addressed by tilting the grid at a certain angle that restores the condition of zero reflection (see FIG. 7). This way the strong dependence on the dielectric layer thickness can be compensated for in a practical set-up.

Utilizing the aforementioned principles and models, several examples of the invention in accordance with the structure described in FIG. 1 are proposed and reported in Tables I and II. Layer thickness t1, t2, t3 (expressed in nm) and material structure are shown in format M1-M2-M3, with M1/t1 (closest to substrate or bottom metal layer), M2/t2 (middle dielectric material), and M3/t3 (metal farthest away from substrate or top metal layer) denoting the material that constitute each layer. Two types of metals (Au and Al) and two types of dielectric materials (Si and $SiO_2$) were considered. In all cases the operating wavelength is λ=1550 nm, and the normal incidence, the index of incident medium 1, and index of substrate being 2.345. Reported therein are the repetition space Λ and line width w, together with the polarization performance, specifically with T and R representing transmission and reflection percentage, respectively. Additionally reported in Table II is the ignition loss (IL) and contrast ratio (CR) as defined above.

TABLE 1

| Grid | $t_1$ | $T_2$ | $t_3$ | Layers |
|---|---|---|---|---|
| 1 | 522 | 224 | 63 | Al—Si—Au |
| 2 | 984 | 200 | 45 | Al—Si—Au |
| 3 | 476 | 234 | 27 | Al—Si—Au |
| 4 | 315 | 183 | 19 | Al—Si—Au |
| 5 | 470 | 532 | 46 | Al—$SiO_2$—Au |
| 6 | 466 | 527 | 47 | Al—$SiO_2$—Au |
| 7 | 412 | 211 | 16 | Au—Si—Al |
| 8 | 480 | 513 | 11 | Au—$SiO_2$—Al |
| 9 | 641 | 233 | 41 | Al—Si—Al |
| 10 | 312 | 192 | 10 | Al—Si—Al |
| 11 | 458 | 535 | 14 | Al—$SiO_2$—Al |
| 12 | 433 | 524 | 12 | Al—$SiO_2$—Al |
| 13 | 499 | 215 | 57 | Au—Si—Au |
| 14 | 439 | 512 | 33 | Au—$SiO_2$—Au |

TABLE II

| Grid | Λ(nm) | w (nm) | $T_{TM}$ (%) | IL (dB) | CR (dB) | $R_{TE}$ (%) |
|---|---|---|---|---|---|---|
| 1 | 400 | 144 | 93.6 | 0.287242 | 41.2 | 0.17 |
| 2 | 597 | 263 | 86.9 | 0.609802 | 62.9 | 2.44 |
| 3 | 355 | 138 | 94.6 | 0.241089 | 46.4 | 4.04 |
| 4 | 469 | 281 | 84.1 | 0.75204 | 40 | 5.4 |
| 5 | 346 | 176 | 86.5 | 0.629839 | 57.5 | 0 |
| 6 | 396 | 210 | 85.2 | 0.695604 | 52.4 | 0 |
| 7 | 334 | 147 | 90.9 | 0.414361 | 40.2 | 0 |
| 8 | 302 | 181 | 82.3 | 0.846002 | 70.3 | 0 |
| 9 | 467 | 154 | 85.4 | 0.685421 | 40 | 0.02 |
| 10 | 483 | 290 | 82.6 | 0.8302 | 40 | 6.7 |
| 11 | 315 | 167 | 88.4 | 0.535477 | 67.2 | 0 |
| 12 | 398 | 235 | 84.7 | 0.721166 | 59.7 | 0 |
| 13 | 339 | 129 | 94.3 | 0.254883 | 41.7 | 0 |
| 14 | 319 | 191 | 82.8 | 0.819697 | 59.8 | 0 |

As can be seen from Tables I and II there are a wide variety of values for repetition spaces and line widths, all with high transmission and suppressed reflection for two orthogonal polarization components. Summarizing, the general feature of the grid polarizer, is as follows. The first or bottom metal layer, closer to the substrate, as well as the middle layer (dielectric) are generally of comparable thickness while the third or top metal layer is generally very thin, typically 10–20 times thinner than the first metal layer.

Further embodiments of the invention are now described and exhibit various configurations which are directed at improving the polarizing performance and are based on the above teachings.

Figure 8:
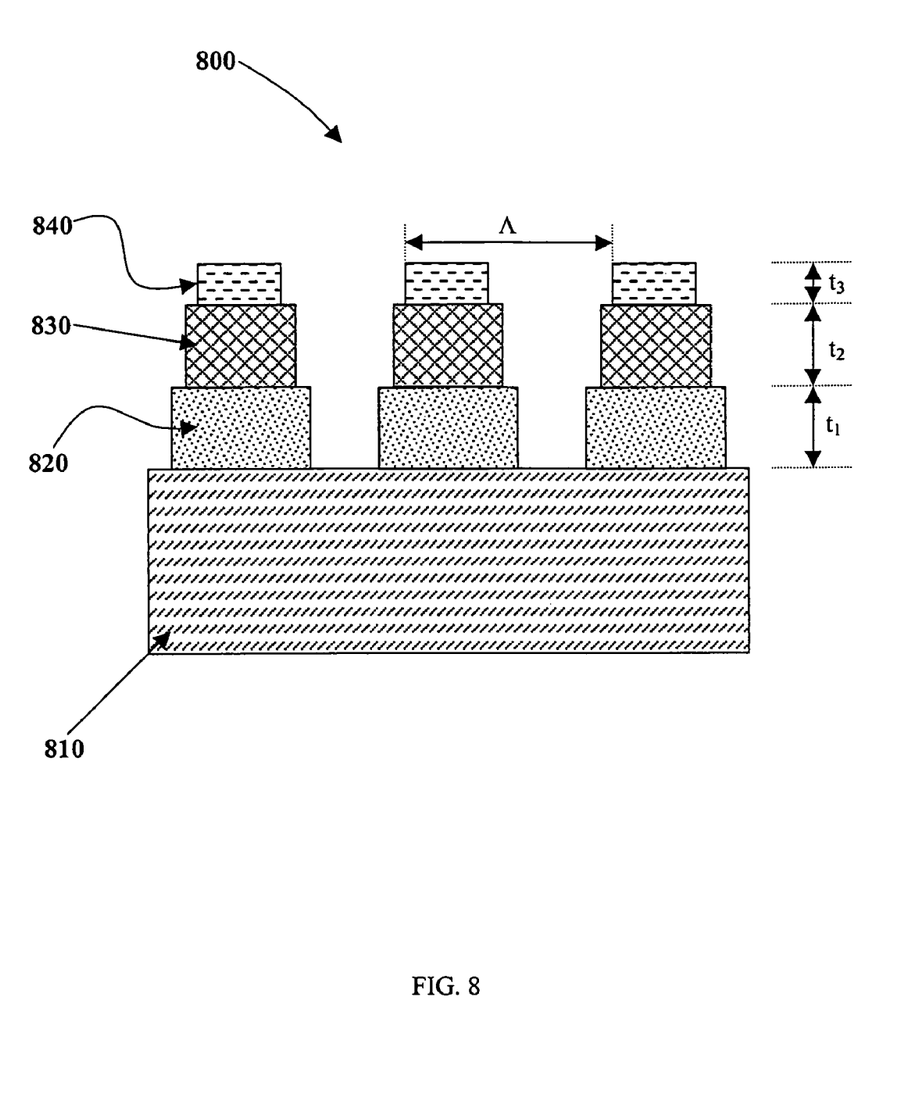
FIG. 8 is a cross-sectional view of an alternative embodiment of a grid polarizer of the present invention.

A further embodiment of the invention is shown on FIG. 8 where the line-widths of deposited materials may differ amongst each other so as to provide further degrees of freedom in design as well as flexibility for device fabrication.

Figure 9:
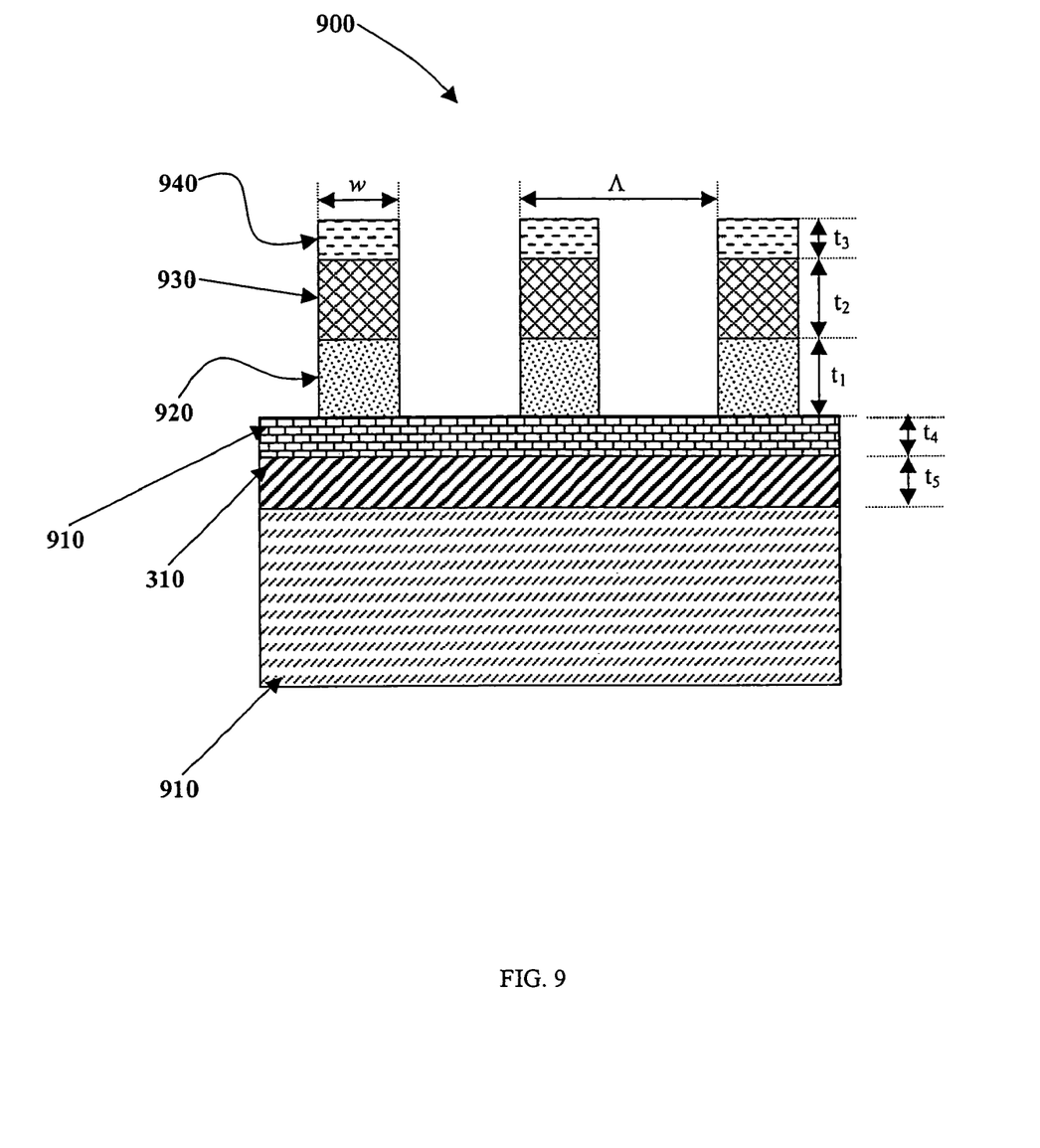
FIG. 9 is a cross-sectional view of an alternative embodiment of a grid polarizer of the present invention.

Another embodiment of the invention is shown on FIG. 9 where, in addition to the stacked metal-dielectric layers that compose the grid, homogeneous film layers are introduced between the substrate and the stacked layers/grid structure. The purpose of these film layers is to increase the total transmission of the device (reduce insertion loss). This is accomplished by adjusting the layer thicknesses to reduce insertion loss.

Figure 10:
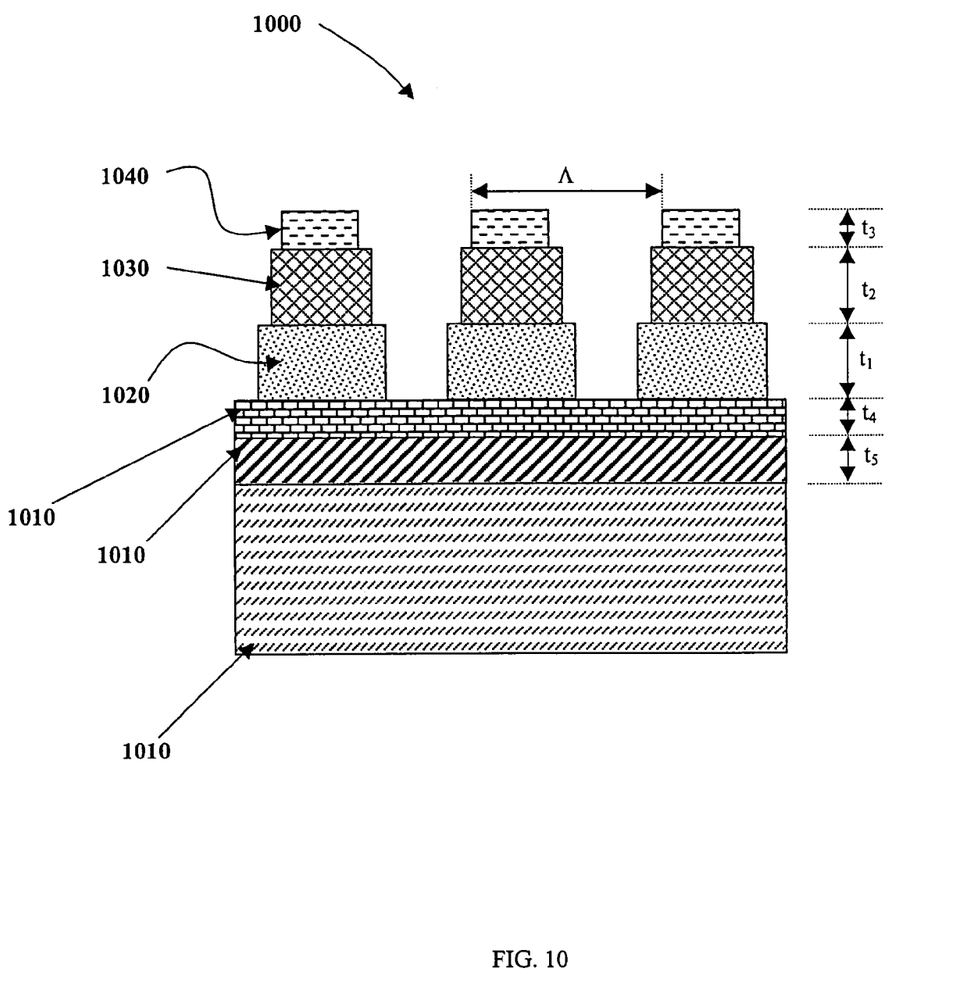
FIG. 10 is a cross-sectional view of an alternative embodiment of a grid polarizer of the present invention.

Yet another embodiment of the invention is shown on FIG. 10 where, in addition to the stacked metal-dielectric layers that compose the grid, homogeneous film layers are introduced between the substrate and the stacked metal-dielectric layers/grid structure. In addition, the line-widths of the grid materials may differ amongst each other. The purpose of the homogeneous layers is to increase the total transmission of the device (reduce insertion loss). This is accomplished by adjusting the layer thicknesses to reduce the reflectivity for TM polarization. The variable line-widths for the stacked metal-dielectric layers of the grid provides further degrees of freedom in design as well as flexibility for device fabrication.

Figure 11:
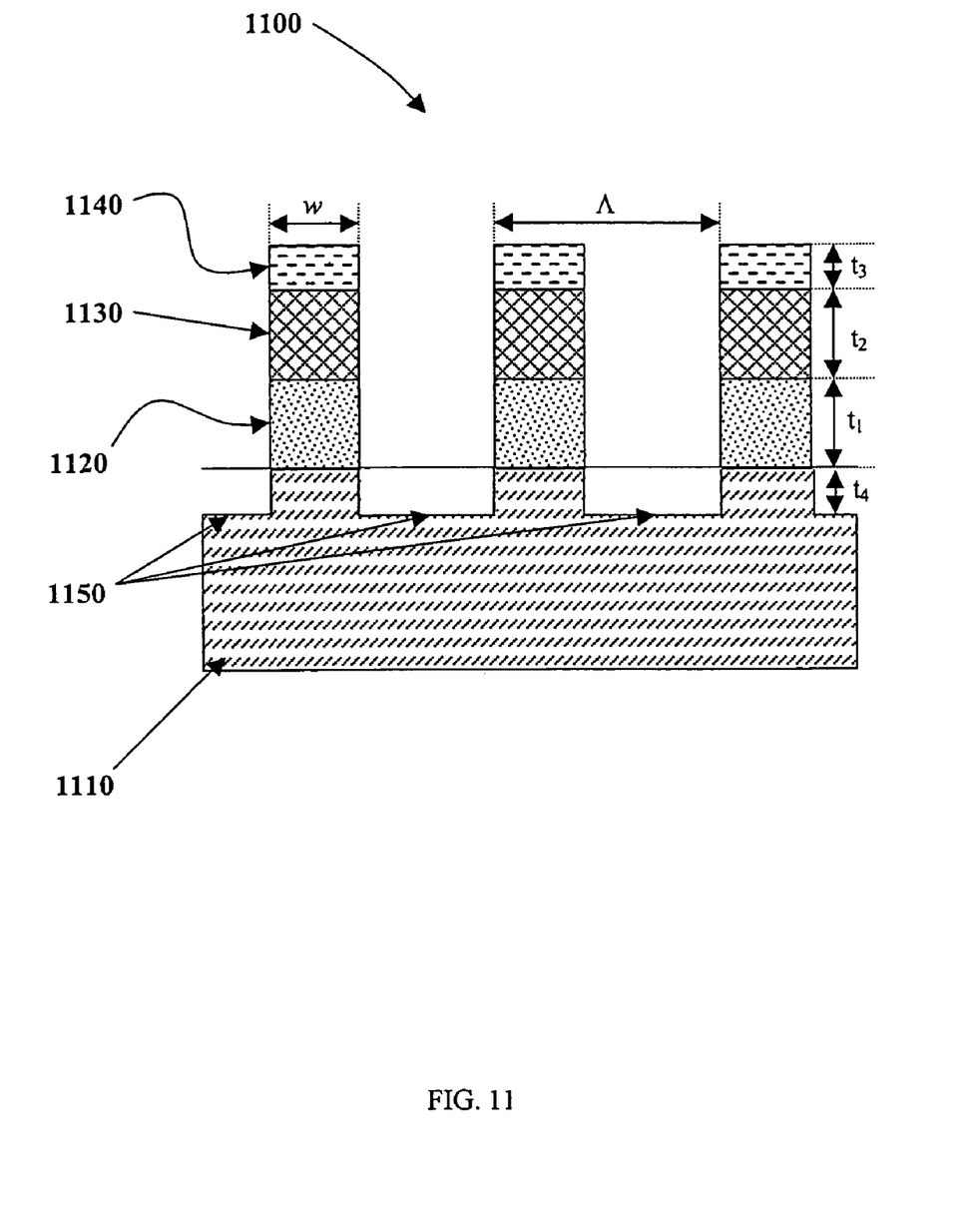
FIG. 11 is a cross-sectional view of an alternative embodiment of a grid polarizer of the present invention.

Another embodiment of the invention is shown on FIG. 11 where the grid structure is deposited on the substrate and a further etch region is incorporated into the substrate. The purpose of the additional substrate etched region is to increase the total transmission of the device (reduce insertion loss). This is accomplished by adjusting the etch depth t4 to reduce the reflectivity for TM polarization.

Figure 12:
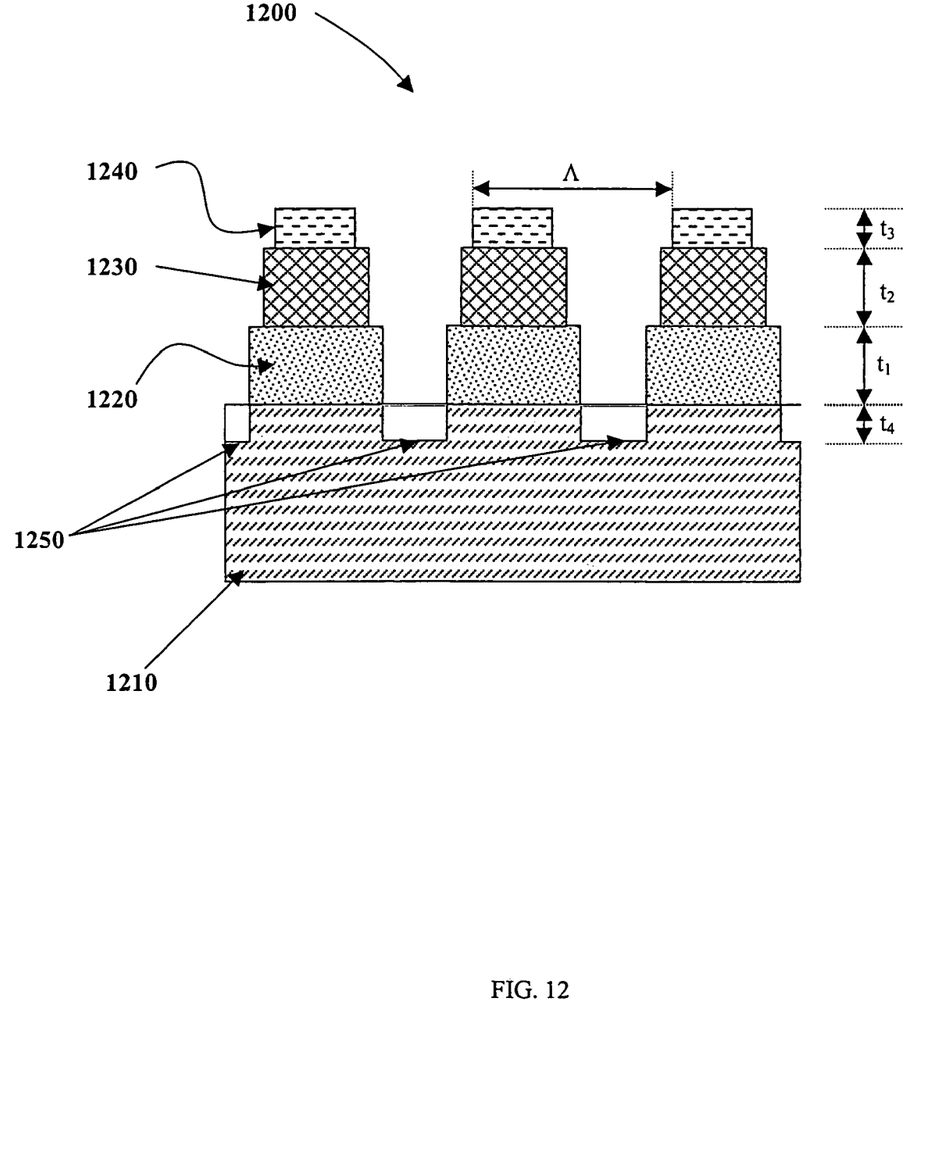
FIG. 12 is a cross-sectional view of an alternative embodiment of a grid polarizer with grid structure, of the present invention.

Another embodiment of the invention is shown on FIG. 12 where the grid structure is deposited on the substrate where the line-widths of the stacked metal-dielectric layers/ grid materials may differ amongst each other and further etched region is incorporated into the substrate. The purpose of the additional substrate etched region is to increase the total transmission of the device (reduce insertion loss). This is accomplished by adjusting the etch depth t4 to reduce the reflectivity for TM polarization. The variable line-widths for the stacked metal-dielectric layers/grid materials provides further degrees of freedom in design as well as flexibility for device fabrication.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A grid polarizer comprising:
a substrate; and
a plurality of stacked metal and dielectric or semiconductor layers, having a width w, disposed on the substrate and forming a parallel grid of stacked layers, the stacked layers spaced apart to form a repetition space between the stacked layers, Λ, such that no diffraction orders are allowed to propagate except the zero order resulting in a grid polarizer that is capable of transmitting substantially all illumination of a given polarization while suppressing at least a portion of the illumination reflected due to an orthogonal polarization component;
wherein the repetition space, Λ, satisfies the relation:

$$\Lambda < \frac{\lambda}{n_t - n_i \sin\theta},$$

where λ represents the operating wavelength of the polarizer, $n_i$ represents the index of the incidence media, and $n_t$ represents the index of the transmitting media;
wherein to stacked layers each comprise a first metal layer, a second dielectric or semiconductor layer, and a third metal layer, the thickness of the second dielectric or semiconductor layer being selected such that a transmission intensity, $I_r$, of the aid polarizer, as represented by the following equation $$I_r = \frac{(r+1-a)^2 - 4r(1-a)\sin^2\frac{1}{2}\varphi}{(r+1)^2 - 4r\sin^2\frac{1}{2}\varphi},$$

is substantially zero,
where α represents absorption by the incident illumination upon interaction with the interface of first metal layer and the second dielectric or semiconductor layer and r represents reflection coefficient.

2. The polarizer of claim 1, which is capable of transmitting substantially all of the illumination of the given polarization while suppressing substantially all of the illumination reflected due to the orthogonal polarization component.

3. The polarizer of claim 1, wherein the first metal layer is adjacent the substrate, the second dielectric or semiconductor layer is adjacent the first metal layer, and the third metal layer is adjacent the second dielectric or semiconductor layer.

4. The polarizer of claim 3, wherein the thickness of the third layer has a thickness operable to allow transmission into the second layer.

5. The polarizer of claim 4 wherein the operating wavelength is 1550 nm and the stacked layers exhibit a width ranging between about 100 to 300 nm.

6. The polarizer of claim 5, wherein each of the stacked layers have a substantially equal width.

7. The polarizer of claim 5, wherein each of the stacked layers has a varying width.

8. The polarizer of claim 3 wherein the thickness of the third layer is less than or equal to 100 nm.

9. The polarizer of claim 1, wherein the first and third metal layers comprise either gold or alumina and the second dielectric or semiconductor layer comprises either Si or $SiO_2$.

10. The polarizer of claim 9, wherein the thickness of the first layer is at least 7 times greater than the thickness of the third layer.

11. The polarizer of claim 9, wherein the thickness of the first layer is at least 10 times greater than the thickness of the third layer.

12. The polarizer of claim 1, wherein the thickness of the first layer is greater than the penetration depth of a metal comprising the first layer such that the first layer reflects substantially all incident light polarized in a direction parallel to the orientation of the grid.

13. The polarizer of claim 1 wherein the repetition space, Λ, is dependent on the intended operating wavelength of the grid polarizer and ranges from 100 to about 1000 nm.

14. The polarizer of claim 5, wherein the operating wavelength is 1550 nm and the stacked layers exhibit a width ranging between about 100 to 300 nm.

15. The polarizer of claim 1, further comprising a homogenous film layer interposed between the stacked layers and the substrate.

16. The polarizer of claim 1, wherein the substrate includes etched regions.

17. The polarizer of claim 16, wherein the etched regions are disposed between the stacked layers.

18. The polarizer of claim 16, wherein the depth of the etched regions is selected to increase the total transmission of light through the polarizer.

19. A arid polarizer comprising:
a substrate; and
a plurality of stacked metal and dielectric or semiconductor layers, having a width w, disposed on the substrate and forming a parallel a-id of stacked layers, the stacked layers spaced apart to form a repetition space between the stacked layers, Λ, such that no diffraction orders are allowed to propagate except the zero order resulting in a grid polarizer that is capable of transmitting substantially all illumination of a given polarization while suppressing at least a portion of the illumination reflected due to an orthogonal polarization component;
wherein the repetition space, Λ, satisfies the relation:

$$\Lambda < \frac{\lambda}{n_t - n_i \sin\theta},$$

where λ represents the operating wavelength, of the polarizer, $n_i$, represents the index of the incidence media, and $n_t$ represents the index of the media;

wherein the transmission intensity as represented by the following equation $$I_r = |E_r|^2 = \frac{(r+1-a)^2 - 4r(1-a)\sin^2\frac{1}{2}\varphi}{(r+1)^2 - 4r\sin^2\frac{1}{2}\varphi}$$

is equal to 0, wherein $E_r$ represents the total reflected field, a represents the absorption experienced by the incident illumination upon interaction with the interface of first metal layer and the dielectric layer and r represents the reflection coefficient.

20. A grid polarizer comprising:
a substrate; and
a plurality of stacked metal and semiconductor layers disposed on the substrate and forming a parallel grid of stacked layers, the grid of stacked layers having a repetition space between the stacked layers such that no diffraction orders are allowed to propagate except the zero order resulting in a grid polarizer that is capable of transmitting substantially all illumination of a given polarization while suppressing at least a portion of the illumination reflected due to an orthogonal polarization component;
wherein the repetition space, Λ, satisfies the relation:

$$\Lambda < \frac{\lambda}{n_t - n_i \sin\theta},$$

where λ represents the operating wavelength of the polarizer, $n_i$ represents the index of the incidence media, and $n_t$ represents the index of the transmitting media.

* * * * *